United States Patent
Yan (10) Patent No.: US 9,489,676 B2
(45) Date of Patent: Nov. 8, 2016

(54) FIXED TOTAL IN COLLABORATIVE SURVEY SYSTEM

(75) Inventor: Nancy Yan, Cupertino, CA (US)

(73) Assignee: SAP SE, Walldorf (DE)

( * ) Notice: Subject to any disclaimer, the term of this patent is extended or adjusted under 35 U.S.C. 154(b) by 1209 days.

(21) Appl. No.: 13/329,636

(22) Filed: Dec. 19, 2011

(65) Prior Publication Data
US 2013/0159911 A1 Jun. 20, 2013

(51) Int. Cl.
G06F 3/048 (2013.01)
G06Q 30/02 (2012.01)
G06Q 10/10 (2012.01)

(52) U.S. Cl.
CPC .............. G06Q 30/02 (2013.01); G06Q 10/10 (2013.01)

(58) Field of Classification Search
CPC ........................................................ G06Q 40/06
See application file for complete search history.

(56) References Cited

U.S. PATENT DOCUMENTS

| | | | | |
|---|---|---|---|---|
| 5,844,572 A * | 12/1998 | Schott | G06F 3/0481 345/440 |
| 6,778,193 B2 * | 8/2004 | Biebesheimer | G06F 17/3053 715/805 |
| 7,966,209 B1 * | 6/2011 | Rider | 705/7.29 |
| 2008/0244419 A1 * | 10/2008 | Kurpick et al. | 715/756 |
| 2009/0164948 A1 * | 6/2009 | Kramer | G06F 17/30398 715/856 |
| 2010/0031157 A1 * | 2/2010 | Neer | G06Q 10/06 715/738 |
| 2010/0250342 A1 * | 9/2010 | Chandra | 705/11 |
| 2012/0272186 A1 * | 10/2012 | Kraut | 715/810 |
| 2013/0132854 A1 * | 5/2013 | Raleigh et al. | 715/738 |
| 2014/0136381 A1 * | 5/2014 | Joseph et al. | 705/35 |
| 2015/0058263 A1 * | 2/2015 | Landers | 706/11 |

OTHER PUBLICATIONS

"Sample Surveys—Sample Survey Questions—Survey Questions", retrieved date Dec. 16, 2011. retrieved from http://www.questionpro.com/sample/index.html, 3pgs.
"QuestionPro Survey—Constant Sum", retrieved date Dec. 16, 2011, retrieved from http://www.questionpro.com/a/TakeSurvey?id=291&responseCheck=false, 1pg.
"The Survey Professionals: Advanced Technology for Online Surveys", retrieved date Dec. 16, 2011, retrieved from http://www.questionpro.com, 1pg.

* cited by examiner

*Primary Examiner* — Ryan Pitaro
(74) *Attorney, Agent, or Firm* — Buckley, Maschoff & Talwalkar LLC (57) ABSTRACT

A system may include presentation of a plurality of options and a graphical indicator, the graphical indicator indicating a first amount to be allotted among one or more of the plurality of options, reception of an instruction to allot a first portion of the first amount to one of the plurality of options, and change of the presented graphical indicator to indicate a new amount to be allotted among one or more of the plurality of options, the new amount equal to a difference between the first amount and the first portion.

19 Claims, 11 Drawing Sheets

Collaboration Portal — 300

Activities ▶ | Updates | Action Items | Extensions | Inbox

Supplier Key Performance Criteria

VIEWS
Work Items
Activity Profile
Action Items
Participants (3)
View Dashboard
Mark Step Complete

ALL WORK ITEMS
Constant Sum Survey
Decision

Constant Sum Survey

358 — 356 — 352 — 350
100
50 — 50 — 50
0
Consumed | Remaining
354

When thinking about the reasons you choose a supplier, please rate the following reasons according to their relative importance:

1. Mass Production Quality
2. Performance History
3. Delivery
4. Warranties and Claim Policies
5. Financial Position
6. Management and Organization
7. Training Aid
8. Repair Services
9. Communication System
10. Procurement ROI (savings/operating costs)

Collaboration Portal

▶ Activities | Updates | Action Items | Extensions | Inbox

Supplier Key Performance Criteria

VIEWS
- Work Items
- Activity Profile
- Action Items
- Participants (3)
- View Dashboard
- Mark Step Complete

ALL WORK ITEMS
- Constant Sum Survey
- Decision

Constant Sum Survey

100 — 358
80 — 356
50
20 — 352
0 — 354
Consumed    Remaining    ← 350

When thinking about the reasons you choose a supplier, please rate the following reasons according to their relative importance:

1. Mass Production Quality
2. Performance History
3. Delivery — 10
4. Warranties and Claim Policies
5. Financial Position — 30
6. Management and Organization
7. Training Aid — 40
8. Repair Services
9. Communication System
10. Procurement ROI (savings/operating costs)

Collaboration Portal                                            _ □ X

| ▶ Activities | Updates | Action Items | Extensions | Inbox |

Supplier Key Performance Criteria

Constant Sum Survey

100 ─┐ ┌─356
 50 ─┤ │358
  0 ─┘ └─ 354 ─── 352
      Consumed    Remaining
                         ↖ 350

When thinking about the reasons you choose a supplier, please rate the following reasons according to their relative importance:

1. Mass Production Quality
2. Performance History
3. Delivery
4. Warranties and Claim Policies
5. Financial Position
6. Management and Organization
7. Training Aid
8. Repair Services
9. Communication System
10. Procurement ROI (savings/operating costs)

[ ] [10] [ ] [50] [40] [ ] [ ]   ⎬ 345

VIEWS
Work Items
Activity Profile
Action Items
Participants (3)
View Dashboard
Mark Step Complete

ALL WORK ITEMS
Constant Sum Survey
Decision

FIXED TOTAL IN COLLABORATIVE SURVEY SYSTEM

FIELD

Some embodiments relate to systems to provide electronic surveys. More specifically, some embodiments relate to electronic surveys in which a total amount to be allotted among a plurality of options is fixed.

BACKGROUND

Computing systems are used ubiquitously to present information to users. This paradigm is particularly useful in business contexts, in which employees access and view data of a business enterprise. Advantageously, business computing systems typically allow simultaneous access to a data store by multiple employees.

Computing systems may also be used to collect information from users and/or the public at-large. Information may be collected, for example, through forms, questionnaires or surveys. Several different types of surveys exist. A "constant sum" survey includes two or more options and asks a user to allot a fixed amount (e.g., 100 "points") between the two or more options, usually to indicate the relative importance of each option to the user. The user may allot any amount out of the total fixed amount to an option.

A "constant count" survey also asks a user to allot a fixed amount (e.g., 5 "votes") among several options. For example, the user may be asked to select three preferred courses among a list of five courses. The total number of selected options therefore equals the fixed amount. Each selected option consumes one "vote" of total fixed amount.

Both types of surveys require users to think in terms of a limited budget and to consider the presented options comparatively. Difficulties in meeting these requirements may cause skewed survey results. These issues are exacerbated in the case of collaborative surveys, in which more than one user may, sequentially or simultaneously, complete a single survey.

Systems are desired to facilitate completion of constant count and constant sum surveys. Such systems may also facilitate collaborative survey completion.

DETAILED DESCRIPTION

Figure 1:
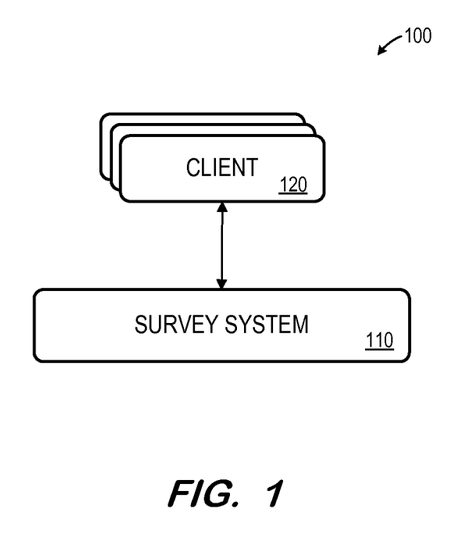
FIG. 1 is a block diagram of a system according to some embodiments.

FIG. 1 is a block diagram of system 100 according to some embodiments. FIG. 1 represents a logical architecture for describing processes according to some embodiments, and actual implementations may include more or different components arranged in other manners.

System 100 includes survey system 110 to provide surveys to and receive survey data from one or more of clients 120. For example, a client 120 may send a request for a survey to survey system 110 and, in response, survey system 110 generates the survey and returns the survey to the requesting client 120.

Survey system 110 may be implemented using any suitable computing architecture. In some embodiments, survey system 110 includes an application server (e.g., ABAP, Oxygen) and a datastore. The application server may provide a platform for collaborative capabilities among several users (i.e., each of whom operates a respective one of clients 120) as is known in the art.

The datastore of survey system 110 may include a survey object to store survey configurations. A survey configuration may consist of a survey type, a survey question, survey options, and a fixed total. Answers to a particular survey received from a particular user are linked to the user's object.

A survey object may specify calculations for determining how much of the fixed total has been allotted to the survey options and how much of the fixed total remains to be allotted. Usage of these calculations according to some embodiments will be described below.

The survey object may also include metadata used to specify access control and to generate a corresponding user interface. In the latter regard, the user interface includes a graphical indicator to at least indicate a current amount to be allotted to the survey options. Examples of such an indicator will be described below.

Generally, survey system 110 may comprise any one or more systems to provide business data. The data of survey system 110 may be received from disparate hardware and software systems, some of which are not interoperational with one another. These systems may comprise a back-end data environment employed in a business or industrial context.

Survey system 110 may store data in traditional fixed disks or in-memory (e.g., in Random Access Memory) to allow fast retrieval and processing thereof. The data may comprise a relational database, an in-memory database, a multi-dimensional database, an eXtendable Markup Language (XML) document, and/or any other structured data storage system. Physical tables of survey system 110 may be distributed among several relational databases, dimensional databases, and/or other data sources. To provide economies of scale, survey system 110 may provide its functionality to more than one customer. Survey system 110 therefore includes mechanisms to ensure that a customer accesses only the data that the customer is authorized to access.

Each of clients 120 displays user interfaces received from survey system 110, and is operated to input data into the user interfaces and transmit the data back to survey system 110. As will be described below, the displayed user interfaces are updated upon input of survey data by the users. Clients 120 may comprise any suitable devices, such as desktop computers, laptop computers, personal digital assistants, tablet PCs, and smartphones. Each of clients 120 may execute program code of a rich client application, a Web browser, an applet in a Web browser, or any other application to communicate with survey system 110 (e.g., via Web Services) to perform the functions attributed thereto herein.

Although system 100 has been described as a distributed system, system 100 may be implemented in some embodiments by a single computing device. For example, both a client 120 and survey system 110 may be embodied by an application executed by a processor of a desktop computer or other computing device.

Figure 2:
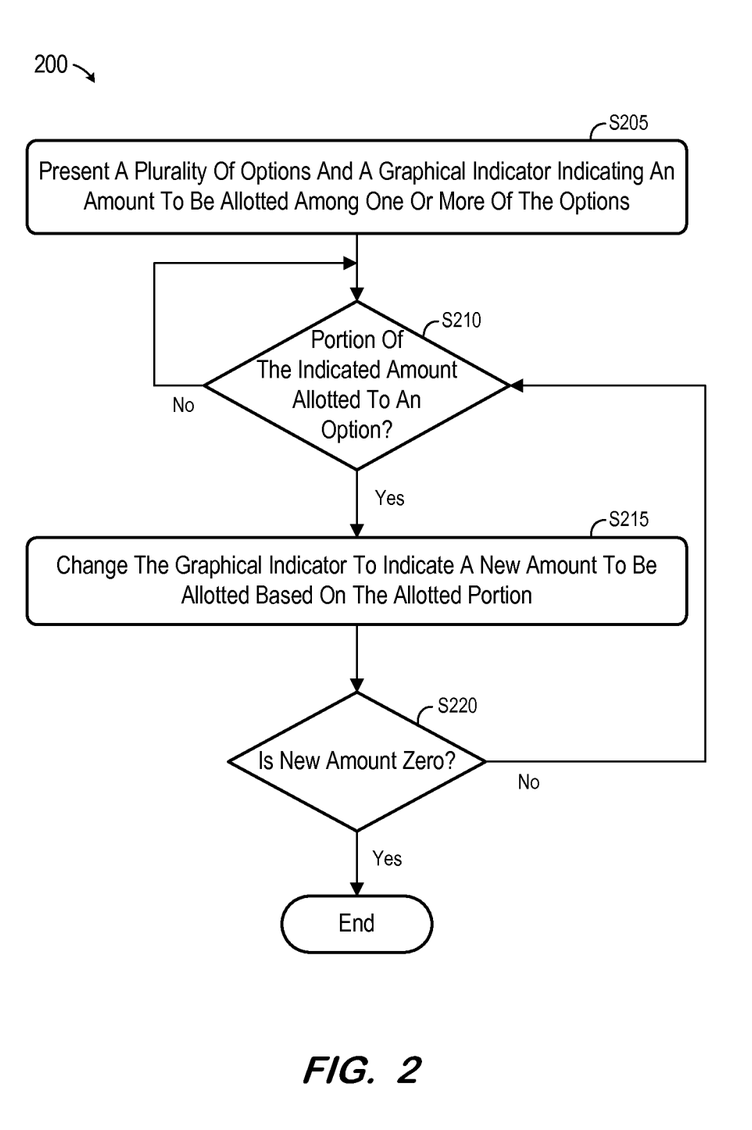
FIG. 2 is a flow diagram of a process according to some embodiments.

FIG. 2 comprises flow diagram of process 200 according to some embodiments. In some embodiments, various hardware elements of system 100 execute program code to perform process 200. In some embodiments, hard-wired circuitry may be used in place of, or in combination with, program code for implementation of processes according to some embodiments. Embodiments are therefore not limited to any specific combination of hardware and software.

Figure 3:
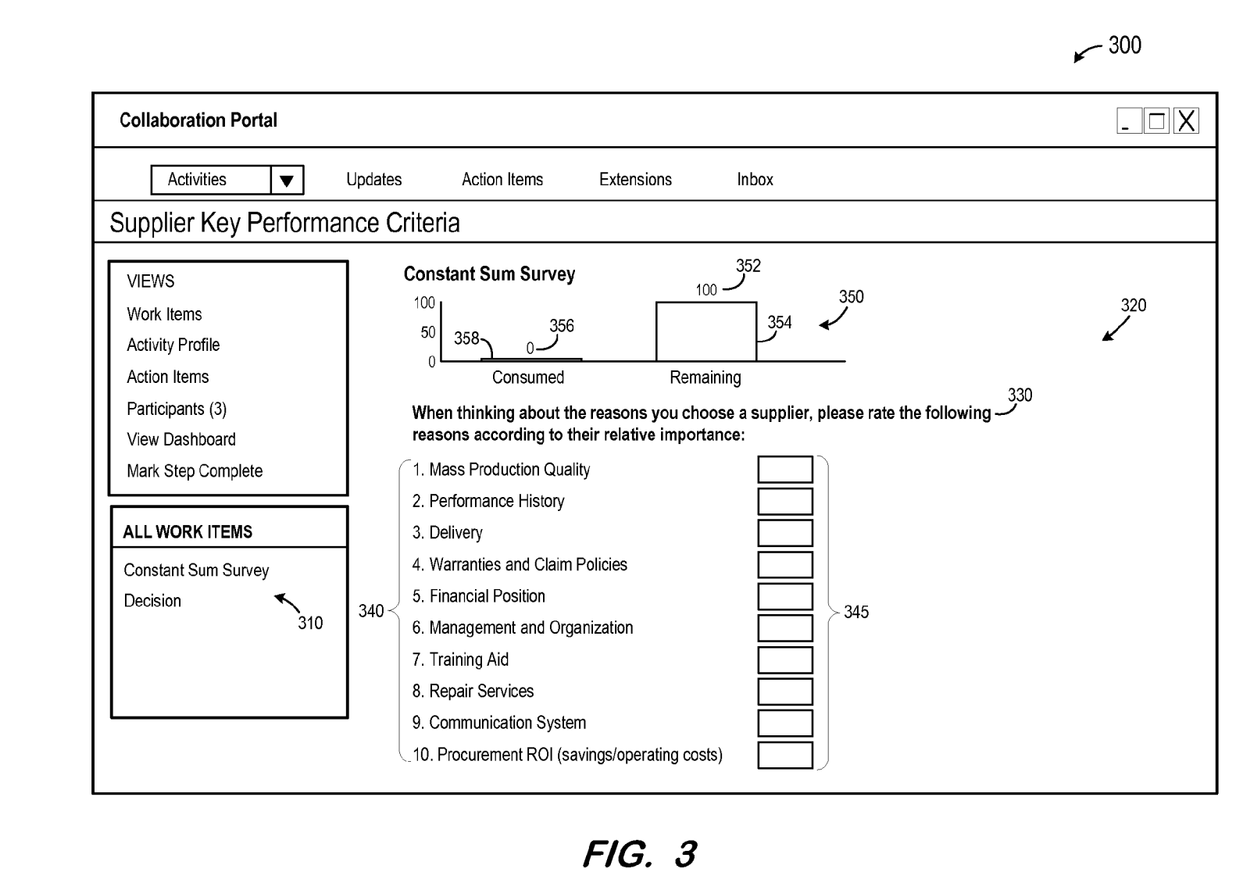
FIG. 3 is a view of a survey application user interface according to some embodiments.

Prior to S205, a client 120 is operated to request a plan from survey system 110. To assist in the present description of an example of process 200, FIG. 3 shows a view of user interface 300 according to some embodiments. User interface 300 may be presented on a display of a client 120 in response to execution of a Web browser application by a processor of a client 120.

According to the present example, it will be assumed that a user has selected Constant Sum Survey from work item list 310. This selection is forwarded to survey application 110 and, in response, survey application 110 transmits data of survey 320 to the client 120.

Based on this data, the client 120 presents survey question 330 and options 340 at S205. Also presented is graphical indicator 350. Graphical indicator 350 indicates a remaining amount (i.e., 100) to be allotted among options 340. This amount is indicated by both numeral 352 and graphic bar 354. Graphical indicator 350 also indicates a second amount (i.e., 0) which is currently allotted among options 340. This second amount is indicated by both numeral 356 and graphic bar 358. Generally, the sum of numeral 352 and numeral 356 is equal to the fixed total to be allotted.

Some embodiments may utilize any suitable graphical representation to indicate the amount to be allotted and/or the currently allotted amount. Non-exhaustive examples include bar charts, pie charts, sliders, gauges, dials, progress bars, etc.

Flow cycles at S210 to await allotment of a portion of the total amount to one of options 340 based on the user's evaluation of question 330. FIG. 3 also shows input boxes 345 according to some embodiments. A user may operate the client 120 to input an amount into one of boxes 345 in order to allot a portion of the total amount to the associated option 340. Embodiments are not limited to this method of allotting amounts to options.

Additionally, the application presenting user interface 300 may provide data validation to ensure that the portion allotted at S210 is not greater than the amount available to be allotted (i.e., the amount indicated by graphical indicators 352 and 354). An error message may be presented or the user input may be otherwise declined if the allotted portion is greater than the amount available.

Figure 4:
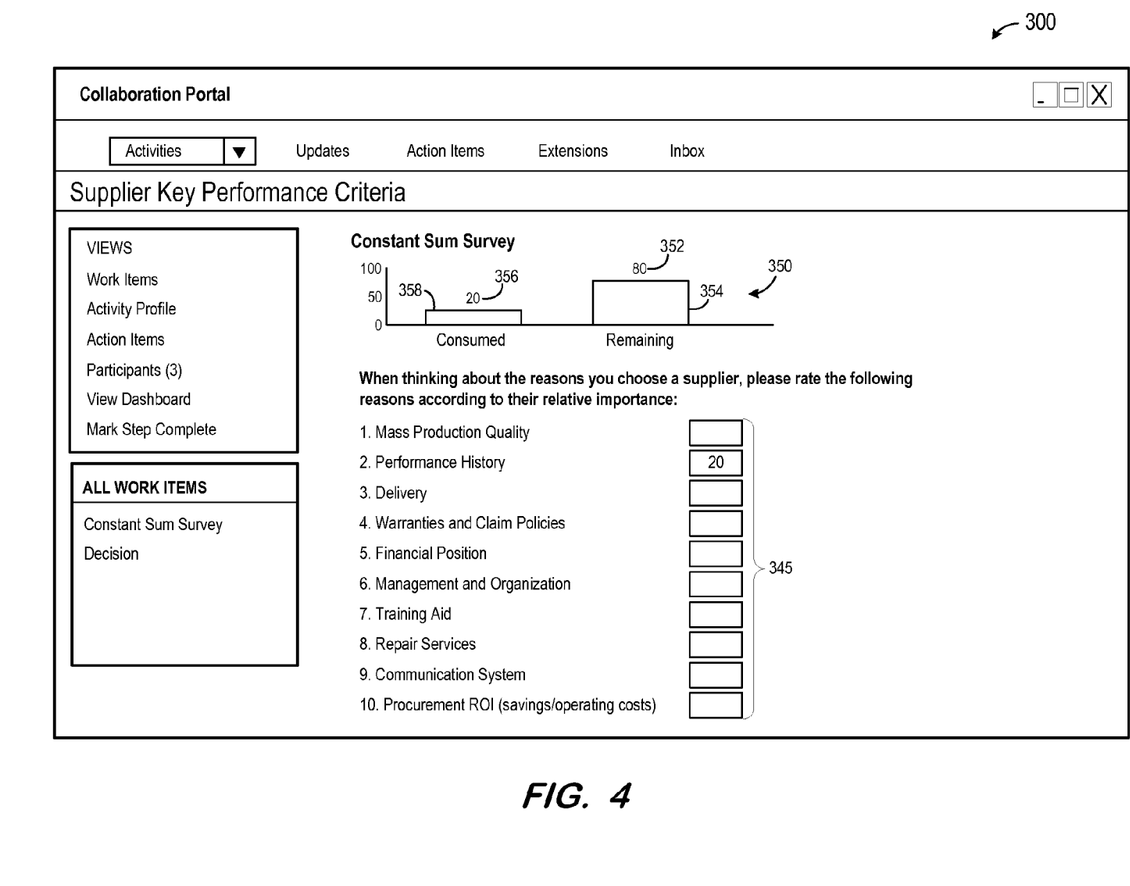
FIG. 4 is a view of a survey application user interface according to some embodiments.

According to the present example, it will be assumed that a user has input "20" into a box 345 as shown in FIG. 4. Flow therefore proceeds to S215, at which the graphical indicator is changed to indicate an increased amount to be allotted based on the portion allotted at S210. This change according to some embodiments is reflected in graphical indication 350 of FIG. 4.

In particular, the size of graphic bar 354 has decreased and numeral 352 has been decremented based on the allotted amount (i.e., 20) to indicate a new amount (i.e., 80). Clearly, the new amount represents the difference between the prior amount to be allotted (i.e., 100) and the amount allotted at S210 (i.e., 20). Moreover, the size of graphic bar 358 has increased and numeral 356 has been incremented based on the allotted amount (i.e., 20) to indicate a "consumed" amount (i.e., 20).

Next, at S220, it is determined whether the new amount indicated at S215 is zero. In other words, S220 determines whether any more of the total amount remains to be allotted. If more of the total remains to be allotted, flow returns to S210 to await further allotments.

Figure 5:
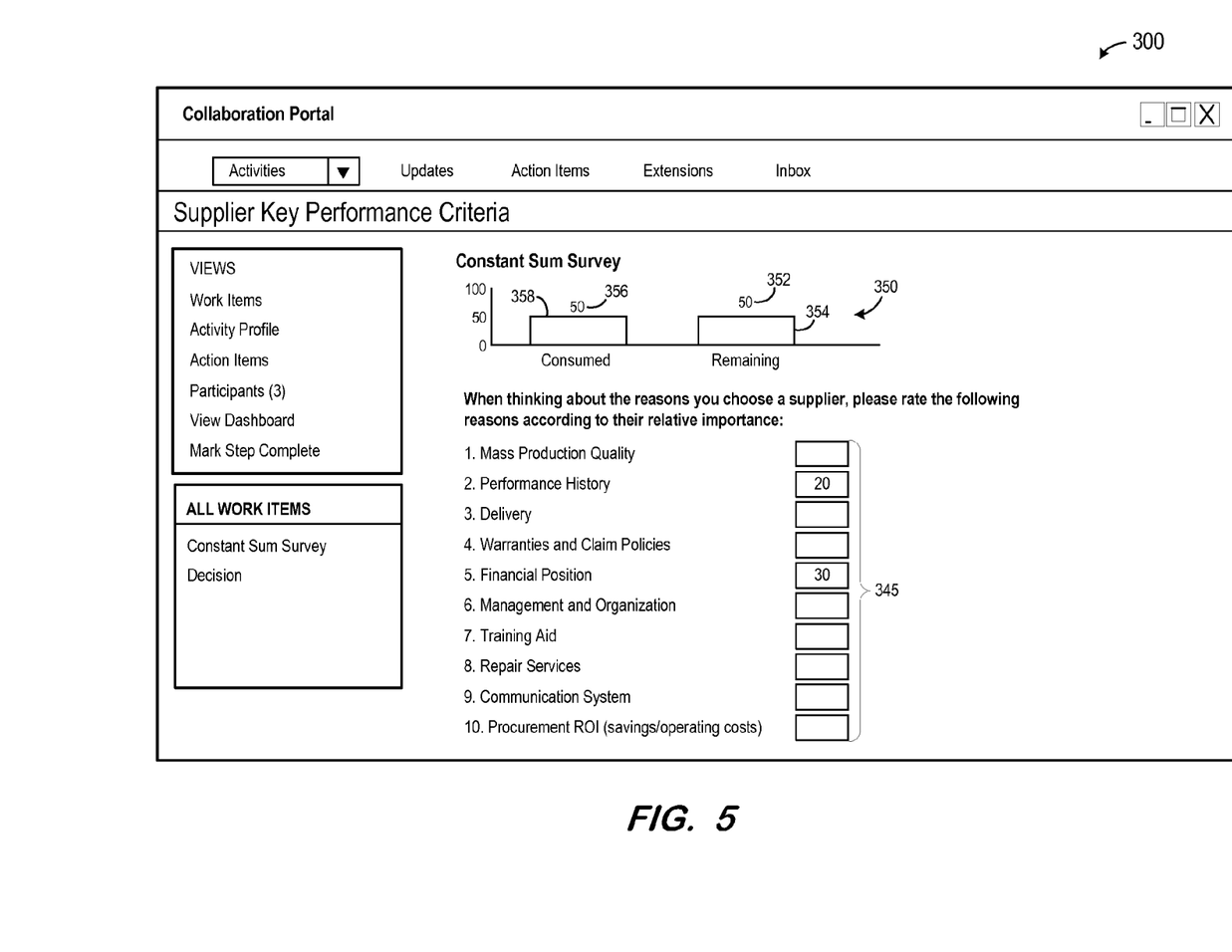
FIG. 5 is a view of a survey application user interface according to some embodiments.

Continuing with the present example, FIG. 5 illustrates subsequent input of the amount "30" into one of boxes 345. According to some embodiments, this input may be provided by a different user operating a different client 120 than the user and client 120 providing the prior input (i.e., "20"). Embodiments may facilitate such collaborative survey completion by indicating the amount remaining to be allotted to all participating users in an intuitive and easy-to-comprehend manner.

In response to the input, the graphical indicator is again changed at S215 to indicate another new amount to be allotted based on the second portion allotted at S210.

As shown in FIG. 5, the size of graphic bar 354 has decreased and numeral 352 has been decremented based on the allotted amount (i.e., 30) to indicate a new amount (i.e., 50) equal to the difference between the prior amount to be allotted (i.e., 80) and the amount allotted at S210 (i.e., 30). The size of graphic bar 358 has also increased and numeral 356 has also been incremented based on the allotted amount (i.e., 30) to indicate a "consumed" amount (i.e., 20+30=50).

Figure 6:
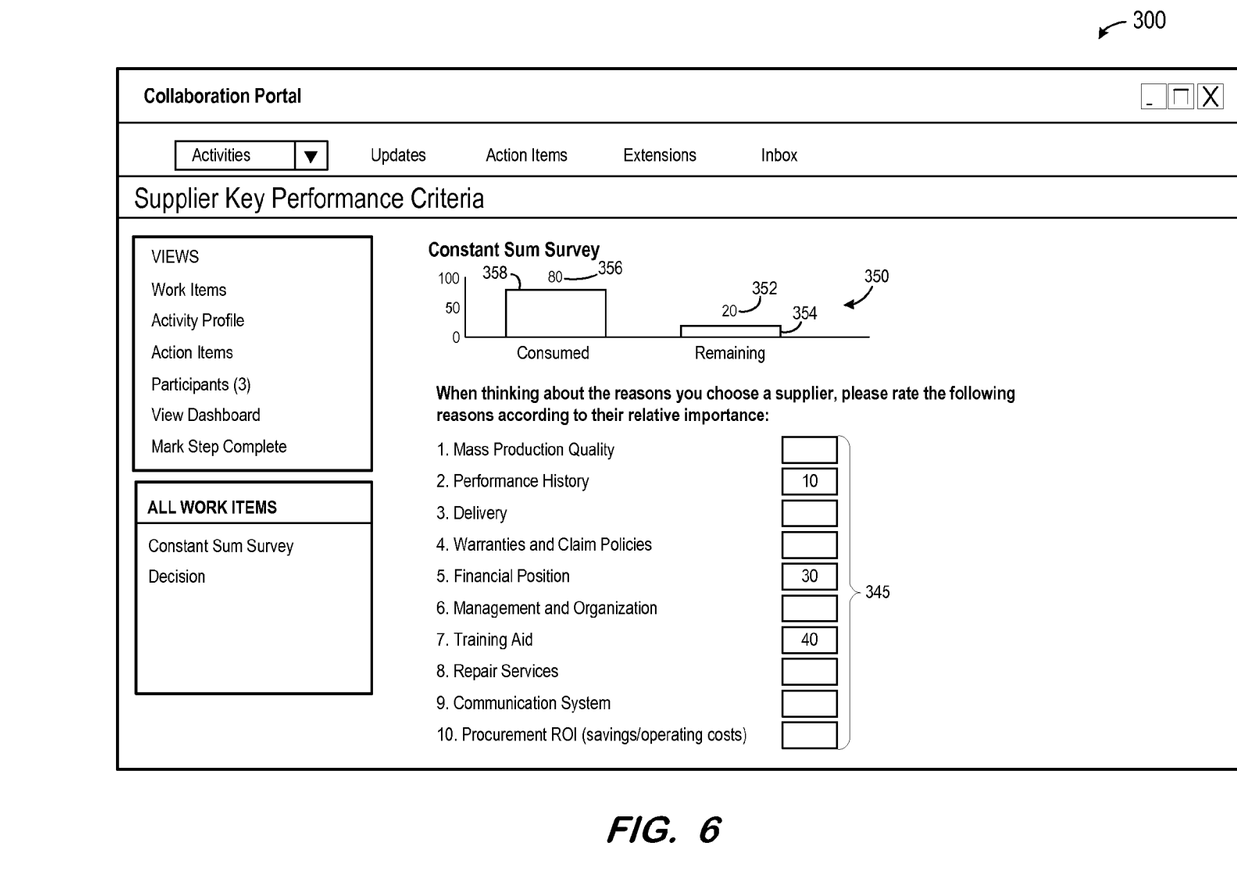
FIG. 6 is a view of a survey application user interface according to some embodiments.

Since the remaining amount to be allotted is not zero, flow again returns from S220 to S210. FIG. 6 illustrates an example in which the originally-input amount (i.e., 20) has been changed to "10" and another amount (i.e., "40") has been entered into one of boxes 345. Accordingly, the net amount allocated in this example is 30.

This allocated net amount results in further decreasing numeral 352 and the size of graphic bar 354 to indicate another new amount (i.e., 20) equal to the difference between the prior amount to be allotted (i.e., 50) and the amount allotted at S210 (i.e., 30). The size of graphic bar 358 and numeral 356 have also increased based on the allotted amount (i.e., 30) to indicate a new "consumed" amount (i.e., 50+30=80).

Figure 7:
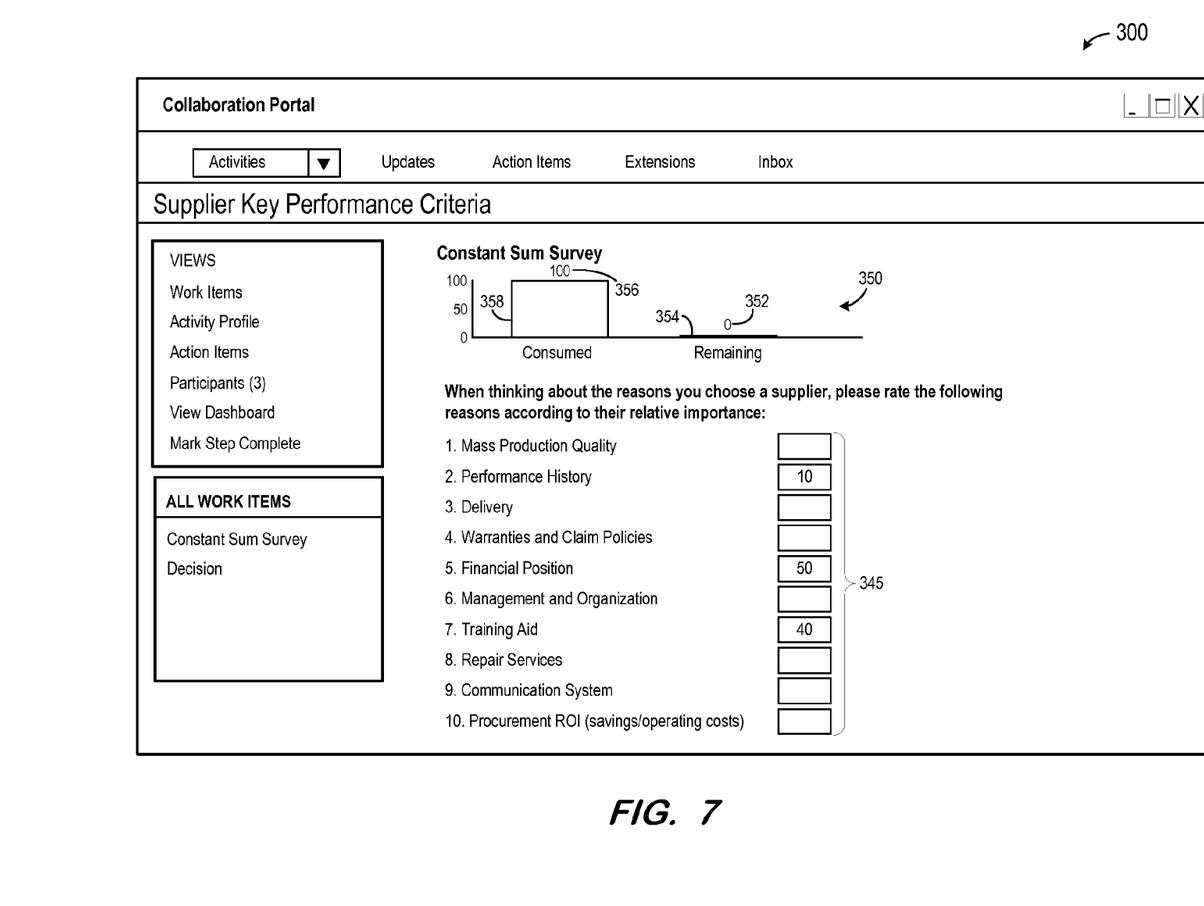
FIG. 7 is a view of a survey application user interface according to some embodiments.

Again, the remaining amount to be allotted is not zero, so flow returns from S220 to S210. Continuing this example, FIG. 7 reflects a change of the input amount "30" to "50", possibly by yet another user. Consequently, numeral 352 and graphic bar 354 now indicate zero, and graphic bar 358 and numeral 356 indicate a "consumed" amount of 100. Flow therefore terminates at S220, after which the allotted amounts may be transmitted to server application 110 (e.g., in response to user selection of a "Done" user interface control). Some embodiments may allow further manipulation of the allotted amounts (as long as the total is not exceeded) prior to transmission of the allotted amounts to server application 110.

Figure 8:
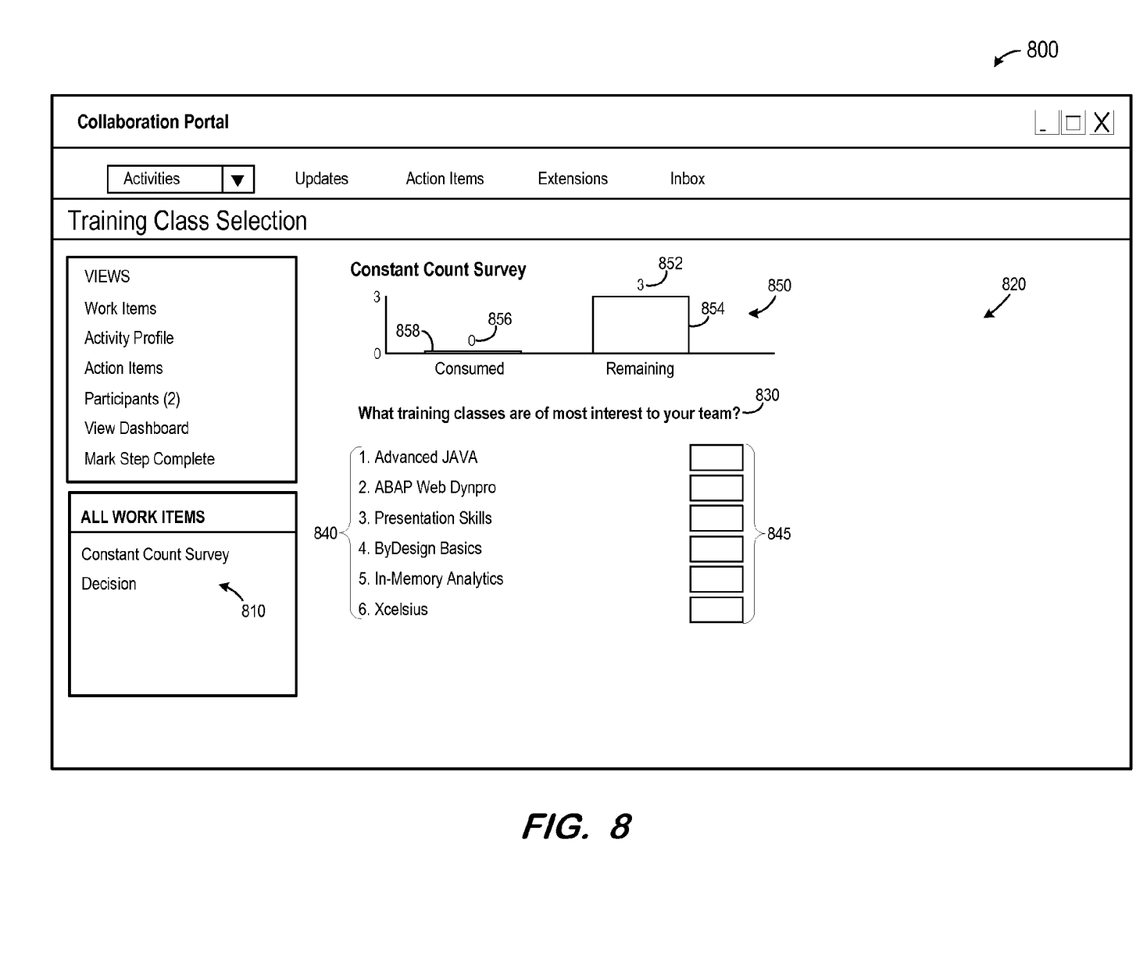
FIG. 8 is a view of a survey application user interface according to some embodiments.
Figure 9:
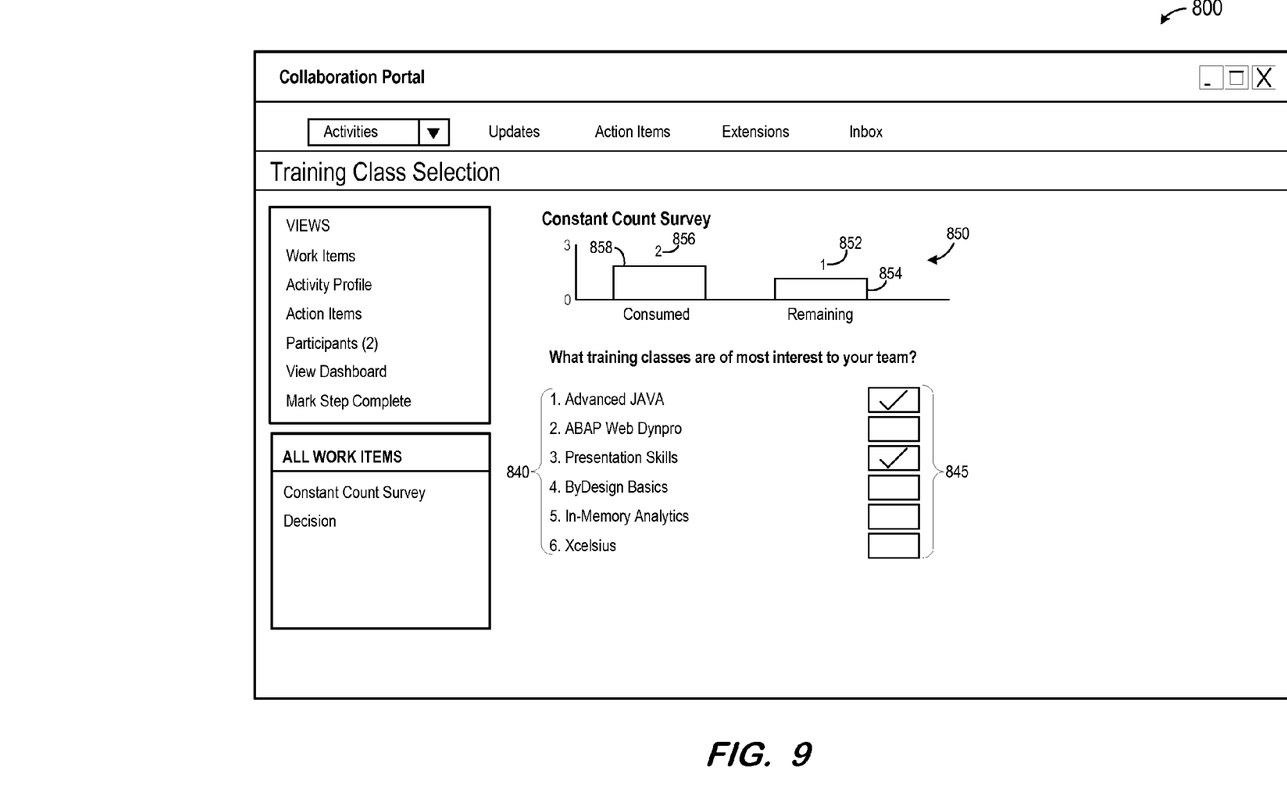
FIG. 9 is a view of a survey application user interface according to some embodiments.
Figure 10:
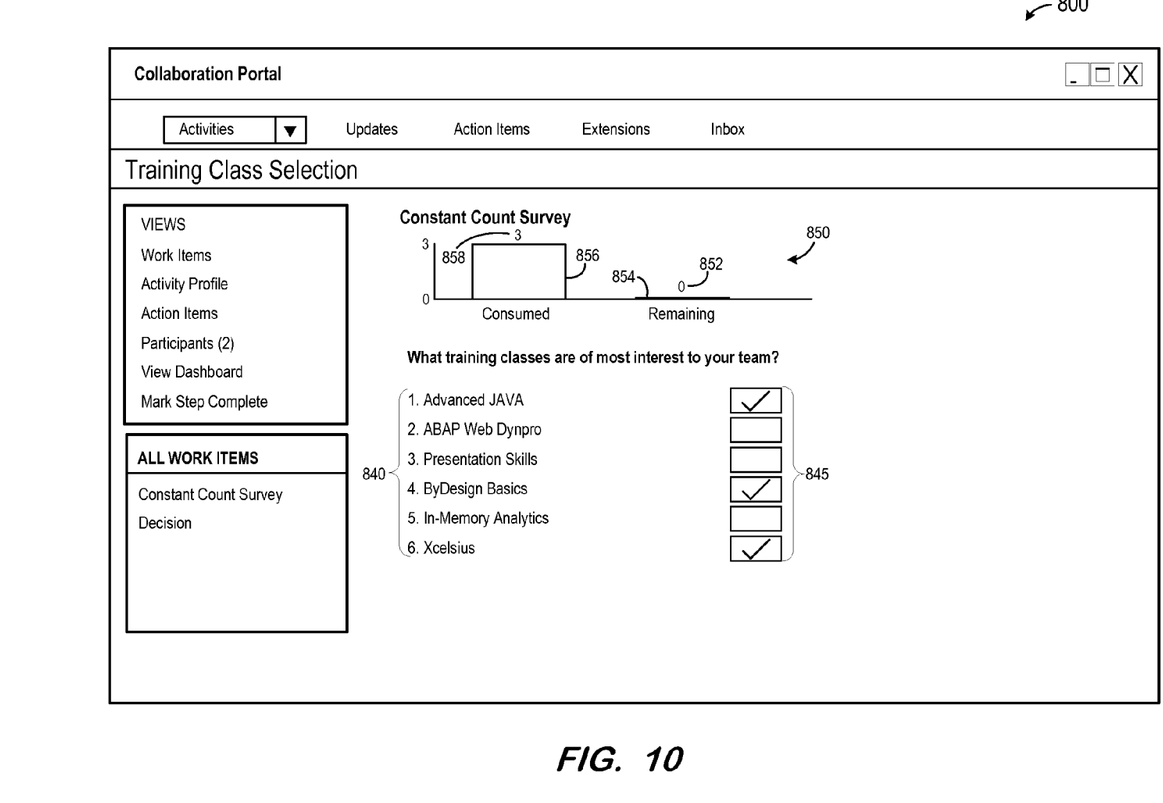
FIG. 10 is a view of a survey application user interface according to some embodiments.

FIGS. 8 through 10 illustrate execution of process 200 in the context of a constant count survey according to some embodiments. User interface 800 may be presented on a display of a client 120 in response to execution of a Web browser application by a processor of a client 120.

As shown in FIG. 8, a user has selected Constant Count Survey from work item list 810. In response, survey application 110 transmits data of survey 820 to the client 120. Survey 820 includes survey question 830 and options 840, which are presented at S205 along with graphical indicator 850. Numeral 852 and graphic bar 854 of graphical indicator 850 indicate an amount (i.e., 3) to be allotted among options 840. This amount may be considered as a number of "votes" which are available to apply to options 840. Numeral 856 and graphic bar 858 of graphical indicator 850 indicate a second amount (i.e., 0) which is currently allotted among options 840. The sum of numeral 852 and numeral 856 is equal to the fixed total to be allotted.

It is now assumed that a user "vote" for two options 840 at S210 as shown in FIG. 9. Graphical indicator 850 is therefore changed to indicate a new amount to be allotted (i.e., 1) based on the portion (i.e., 2) allotted. Since every "vote" is counted as 1, the selection of two options causes numeral 856 to indicate 2 as the consumed amount and 1 (i.e., 3−2=1) as the remaining amount to be allotted. Since the remaining amount is not zero, flow returns from 5220 to 5210.

Continuing this example, FIG. 10 reflects a selection of an additional option 840. Accordingly, numeral 852 and graphic bar 854 now indicate zero, and graphic bar 858 and numeral 856 indicate a "consumed" amount of 3. Flow therefore terminates at 5220, after which the selected options may be transmitted to server application 110. Again, some embodiments may utilize a "Done" interface control to allow further manipulation of the allotted amounts (as long as the total is not exceeded) prior to transmission of the allotted amounts to server application 110.

Figure 11:
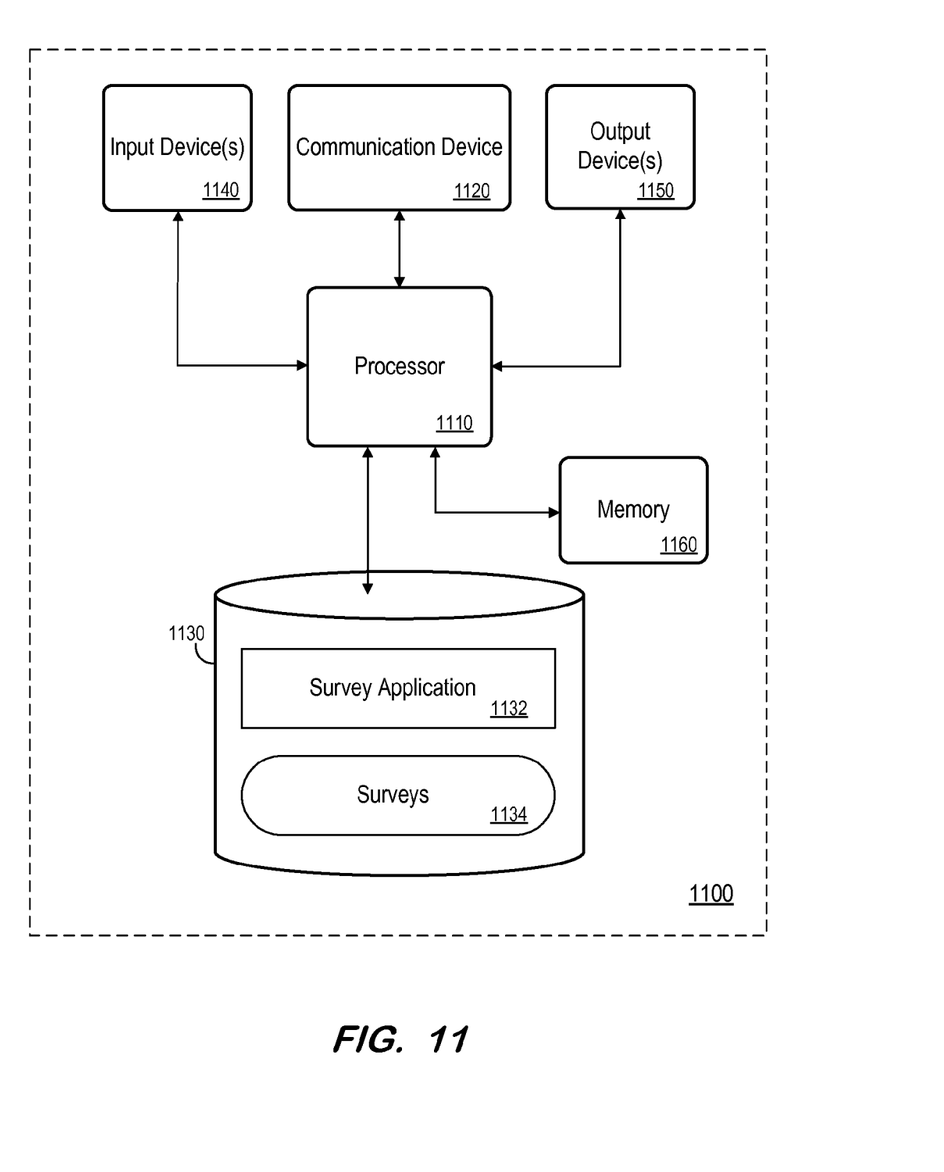
FIG. 11 is a block diagram of a computing device according to some embodiments.

FIG. 11 is a block diagram of apparatus 1100 according to some embodiments. Apparatus 1100 may comprise a general-purpose computing apparatus and may execute program code to perform any of the functions described herein. Apparatus 1100 may comprise an implementation of either element or both elements of system 100. Apparatus 1100 may include other unshown elements according to some embodiments.

Apparatus 1100 includes processor 1110 operatively coupled to communication device 1120, data storage device 1130, one or more input devices 1140, one or more output devices 1150 and memory 1160. Communication device 1120 may facilitate communication with external devices, such as an external design tool. Input device(s) 1140 may comprise, for example, a keyboard, a keypad, a touch pad on mobile devices, a mouse or other pointing device, a microphone, knob or a switch, an infra-red (IR) port, a docking station, and/or a touch screen. Input device(s) 1140 may be used, for example, to enter information into apparatus 1100. Output device(s) 1150 may comprise, for example, a display (e.g., a display screen) a speaker, and/or a printer.

Data storage device 1130 may comprise any appropriate persistent storage device, including combinations of magnetic storage devices (e.g., magnetic tape, hard disk drives and flash memory), optical storage devices, Read Only Memory (ROM) devices, etc., while memory 1160 may comprise Random Access Memory (RAM).

Survey application 1132 of data storage device 1130 may comprise program code executable by processor 1110 to provide any of the functions described herein. Embodiments are not limited to execution of these functions by a single apparatus. Surveys 1134 may include survey objects and/or completed survey data as described herein. Memory 1160 may also or alternatively store data of surveys 1134, with surveys 1134 providing a persistent backup. Data storage device 1130 may also store data and other program code for providing additional functionality and/or which are necessary for operation thereof, such as device drivers, operating system files, etc.

Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A method implemented by a computing system in response to execution of program code by a processor of the computing system, the method comprising:

presenting a plurality of options in a first area of a user interface and a graphical indicator in a second area of the user interface, the graphical indicator including an allotted amount area indicating a first allotted amount and an amount to be allotted area, distinct from the allotted amount area, the amount to be allotted area indicating a first amount to be allotted among one or more of the plurality of options, wherein each of the first allotted amount and the first amount to be allotted is indicated by both a numerical representation and a graphical representation;

receiving a first instruction to allot a first portion of the first amount to be allotted to one of the plurality of options in the first area of the user interface; and changing the presented graphical indicator in the second area of the user interface to indicate a new allotted amount in the allotted amount area and a new amount to be allotted among one or more of the plurality of options in the amount to be allotted area, the new allotted amount equal to the sum of first allotted amount and the first portion of the first amount to be allotted and the new to be allotted amount equal to a difference between the first amount to be allotted and the first portion, wherein each of the new allotted amount and the new amount to be allotted is indicated by both a numerical representation and a graphical representation.

2. The method according to claim 1, further comprising:

receiving a second instruction to allot a second portion of the new amount to be allotted to one of the plurality of options in the first area of the user interface; and changing the presented graphical indicator in amount to be allotted area of the second area of the user interface to indicate a second new amount to be allotted among one or more of the plurality of options in the first area user interface, the second new amount to be allotted equal to a difference between the new amount to be allotted and the second portion.

3. The method according to claim 2, wherein the changed presented graphical indicator further indicates a second allotted amount equal to a sum of the first portion and the second portion.

4. The method according to claim 2, wherein the first instruction is received from a first user and the second instruction is received from a second user.

5. The method according to claim 4, wherein the changed presented graphical indicator further indicates a second allotted amount equal to a sum of the first portion and the second portion.

6. The method of claim 1, wherein the graphical representation is a diagrammatical visualization of the numerical representation.

7. The method of claim 1, further comprising:
validating the first amount to be allotted is not greater than an amount available to be allotted.

8. The method of claim 1, further comprising:
determining whether the new amount to be allotted is zero.

9. The method of claim 8, further comprising:
receiving a second instruction to allot a second portion of the new amount to be allotted to one of the plurality of options in the first area of the user interface if the new amount to be allotted is greater than zero.

10. A non-transitory medium storing processor-executable program code, the program code executable by a device to:
present a plurality of options in a first area of a user interface and a graphical indicator in a second area of the user interface, the graphical indicator including an allotted amount area indicating a first allotted amount and an amount to be allotted area distinct from the allotted amount area, the amount to be allotted area indicating a first amount to be allotted among one or more of the plurality of options, wherein each of the first allotted amount and the first amount to be allotted is indicated by both a numerical representation and a graphical representation;
receive a first instruction to allot a first portion of the first amount to be allotted to one of the plurality of options in the first area of the user interface; and
change the presented graphical indicator in the second area of the user interface to indicate a new allotted amount in the allotted amount area and a new amount to be allotted among one or more of the plurality of options in the amount to be allotted area, the new allotted amount equal to the sum of the first allotted amount and the first portion of the first amount to be allotted and the new to be allotted amount equal to a difference between the first amount to be allotted and the first portion, wherein each of the new allotted amount and the new amount to be allotted is indicated by both a numerical representation and a graphical representation.

11. The medium according to claim 10, the program code further executable by a device to:

receive a second instruction to allot a second portion of the new amount to be allotted to one of the plurality of options in the first area of the user interface; and change the presented graphical indicator in amount to be allotted area of the second area of the user interface to indicate a second new amount to be allotted among one or more of the plurality of options in the first area of the user interface, the second new amount equal to a difference between the new amount to be allotted and the second portion.

12. The medium according to claim 11, wherein the changed presented graphical indicator further indicates a second allotted amount equal to a sum of the first portion and the second portion.

13. The medium according to claim 11, wherein the first instruction is received from a first user and the second instruction is received from a second user.

14. The medium according to claim 13, wherein the changed presented graphical indicator further indicates a second allotted amount equal to a sum of the first portion and the second portion.

15. A system comprising:
a computing device comprising:
a memory storing processor-executable program code; and
a processor to execute the processor-executable program code in order to cause the computing device to:
present a plurality of options in a first area of a user interface and a graphical indicator in a second area of the user interface, the graphical indicator including an allotted amount area indicating a first amount and an amount to be allotted area distinct from the allotted amount area, the amount to be allotted area indicating a first amount to be allotted among one or more of the plurality of options, wherein each of the first allotted amount and the first amount to be allotted is indicated by both a numerical representation and a graphical representation;
receive a first instruction to allot a first portion of the first amount to be allotted to one of the plurality of options in the first area of the user interface; and
change the presented graphical indicator in the second area of the user interface to indicate a new allotted amount in the allotted amount area and a new amount to be allotted among one or more of the plurality of options in the amount to be allotted area, the new allotted amount equal to the sum of first allotted amount and the first portion of the first amount to be allotted and the new to be allotted amount equal to a difference between the first amount to be allotted and the first portion, wherein each of the new allotted amount and the new amount to be allotted is indicated by both a numerical representation and a graphical representation.

16. The system according to claim 15, the processor to further execute the processor-executable program code in order to cause the computing device to:
receive a second instruction to allot a second portion of the new amount to be allotted to one of the plurality of options in the first area of the user interface; and
change the presented graphical indicator in the amount to be allotted area of the second portion of the user interface to indicate a second new amount to be allotted among one or more of the plurality of options in the first area of the user interface, the second new amount to be allotted equal to a difference between the new amount and the second portion.

17. The system according to claim 16, wherein the changed presented graphical indicator further indicates a second allotted amount equal to a sum of the first portion and the second portion.

18. The system according to claim 16, wherein the first instruction is received from a first user and the second instruction is received from a second user.

19. The system according to claim 18, wherein the changed presented graphical indicator further indicates a second allotted amount equal to a sum of the first portion and the second portion.

* * * * *